(12) United States Patent
Lamprecht

(10) Patent No.: US 7,196,440 B2
(45) Date of Patent: Mar. 27, 2007

(54) ELECTRIC MANUAL MACHINE TOOL DRIVEN BY AN ELECTRIC MOTOR

(75) Inventor: Justus Lamprecht, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 10/520,432

(22) PCT Filed: Apr. 28, 2004

(86) PCT No.: PCT/DE2004/000890

§ 371 (c)(1),
(2), (4) Date: Jan. 6, 2005

(87) PCT Pub. No.: WO2004/098000

PCT Pub. Date: Nov. 11, 2004

(65) Prior Publication Data

US 2005/0247468 A1    Nov. 10, 2005

(30) Foreign Application Priority Data

Apr. 29, 2003   (DE) ............................... 103 19 460

(51) Int. Cl.
*H02K 9/00* (2006.01)
*H02K 9/06* (2006.01)
*H01R 39/00* (2006.01)
*H01R 39/14* (2006.01)

(52) U.S. Cl. .................. 310/60 A; 310/233

(58) Field of Classification Search ............ 310/233, 310/235–237, 43, 58, 60 R, 60 A
See application file for complete search history.

(56) References Cited

U.S. PATENT DOCUMENTS

| 1,539,068 | A | * | 5/1925 | Brockett | 173/170 |
| 1,822,859 | A | * | 9/1931 | Perkins | 310/68 R |
| 1,826,628 | A | * | 10/1931 | Moore | 310/236 |
| 2,347,056 | A | * | 4/1944 | Keistman | 310/236 |
| 2,636,136 | A | * | 4/1953 | Gubbins | 310/50 |
| 2,990,488 | A | * | 6/1961 | Wick et al. | 310/235 |
| 3,430,084 | A | * | 2/1969 | Hall et al. | 310/50 |
| 4,562,369 | A | | 12/1985 | Gerlach et al. | |
| 6,958,563 | B2 | * | 10/2005 | Hockaday et al. | 310/233 |

FOREIGN PATENT DOCUMENTS

| CH | 542 539 | 9/1973 |
| DE | 313 299 | 7/1919 |
| DE | 891 415 | 9/1953 |
| EP | 0 350 855 A2 | 1/1990 |
| GB | 453 067 | 9/1936 |
| GB | 632 020 | 11/1949 |
| GB | 1 505 806 | 3/1978 |

\* cited by examiner

*Primary Examiner*—Tran Nguyen
(74) *Attorney, Agent, or Firm*—Michael J. Striker

(57) ABSTRACT

A hand power tool that is driven via an electric motor (20), the electric motor (20) having a commutator (28) which is formed of disklike annular segments or laminations (32), is made more secure against contact spark development by providing that at least one of the laminations (32) has at least one central recess (42, 44, 46).

9 Claims, 6 Drawing Sheets

ELECTRIC MANUAL MACHINE TOOL DRIVEN BY AN ELECTRIC MOTOR

BACKGROUND OF THE INVENTION

The invention is based on a hand power tool.

From European Patent Disclosure EP 350 855, a commutator for a universal motor is known, of the kind also provided for hand power tools. Its laminations have the outer contour of a low rectangle whose short sides have U-shaped openings into which an annular armature that bundles the laminations together in ringlike fashion can be placed. The laminations are also shaped in the form of bars and, at the operating speed of approximately 3000 rpm of the electric motor that carries the commutator, they are subjected to relatively strong forces that bend the individual laminations outward and cause the commutator, on its outside oriented toward the carbon brushes, not to have a flat, cylindrical contour but rather to have the tendency of having a curved convex contour. As a result, the contact area between the arched outside of the commutator and the flat carbon brushes is reduced considerably, resulting in increased spark development between the carbon brushes and the commutator; both the commutator and the carbon brushes suffer considerable wear or damage from the high temperatures in the arc.

In known commutators of hand power tool motors, the attempt has been made to counteract their deformation at high rpm by means of annular armatures, which keep the annularly bundled laminations that form the commutator prestressed radially inward. This arrangement has had only partial success, and despite the provisions described the known commutators are only inadequately secured against deformation and are relatively complicated and expensive to produce and install.

SUMMARY OF THE INVENTION

The present invention has the advantage that even at extremely high rpm the commutator does not become perceptibly performed and consequences assures a low-spark contact with the carbon brushes. As a result, wear of both the carbon brushes and the commutator is slight, and the service life of the applicable electrical motor is prolonged. Its efficiency is improved, since more electrical power is converted into work and less into heat. Furthermore, because of the lesser amount of arcing, interference in the radio wave range is less, and interference suppression for the hand power tool is simplified or can be dispensed with.

Because the commutator lamination has at least one central recess, it forms a bar profile that is dimensionally stable and that because of the high radial acceleration presents high resistance to deformation or bending in response to deformation forces oriented transversely to the longitudinal axis and that because of the reduction in mass is exposed to lesser forces of deformation than commutator laminations known before now.

Because the recess extends centrally transversely through the lamination, the lamination packet bundled annularly relative to the commutator forms an annular conduit through which cooling air can be passed, or which can be engaged by a further annular armature, which prestresses the laminations radially inward at the center so that at high rpm they can be deformed radially outward only slightly.

Because the recess is punched, and a thin residual wall remains, the structure of the material comprising the lamination is strengthened and the dimensional stability is improved because of the profile formation.

Because the recess is designed as a windowlike opening through which the lamination reaches completely, a mass-reducing annular conduit is formed in the commutator; compared to previous embodiments, this enables a better distribution of the adhesive or compacting compound for holding the commutator together.

Because a recess extends longitudinally through the barlike lamination, the lamination is lighter than a solid lamination and is at least equally dimensionally stable. Because of the lesser mass of each lamination, lesser mass forces are operative, so that at high radial acceleration, the deformation of the laminations or of the commutator is less.

Because the central transverse recess is oval or is an ovally contoured, for instance octagonal, polygon, the corresponding lamination forms an especially dimensionally stable profile.

Because the lamination has additional, open transverse recesses on both ends, the end regions of the laminations can have a tendency to deform radially outward more markedly than solid laminations. This serves to counteract arching outward of the middle region of the lamination, so that the lamination remains flat in the region of contact with the carbon brushes. The end regions have a cross section that increases from the outside inward and thus have increasing bending strength, so that their radial deformation outward caused by centrifugal force is reduced. Moreover, the compacting compound or the adhesive can become better distributed in the region of the voids.

Because the ends of the barlike laminations form a fan blade, an additional cooling air flow is generated around the commutator or through it and, because of better cooling, markedly improves the efficiency of the electric motor equipped with the commutator of the invention.

Because a cooling air flow is passed through the recess, the individual laminations and thus the entire commutator can be cooled. This precludes a heat buildup and overheating of the electric motor.

Because a prestressable annular armature reaches through the central transverse recess, the deformation of the laminations at high radial acceleration can be counteracted.

Because the transverse recesses form everted features toward one side of each lamination, the laminations in the annular composite structure form an especially stable structure that is secure against deformation.

Because the laminations are provided with fan blades on their outer ends acting as contact lugs, the cooling of the motor in the commutator region is improved.

DRAWINGS

The invention is described in further detail below in terms of an exemplary embodiment in conjunction with the drawings.

DESCRIPTION OF THE PREFERRED EMBODIMENTS

Figure 1:
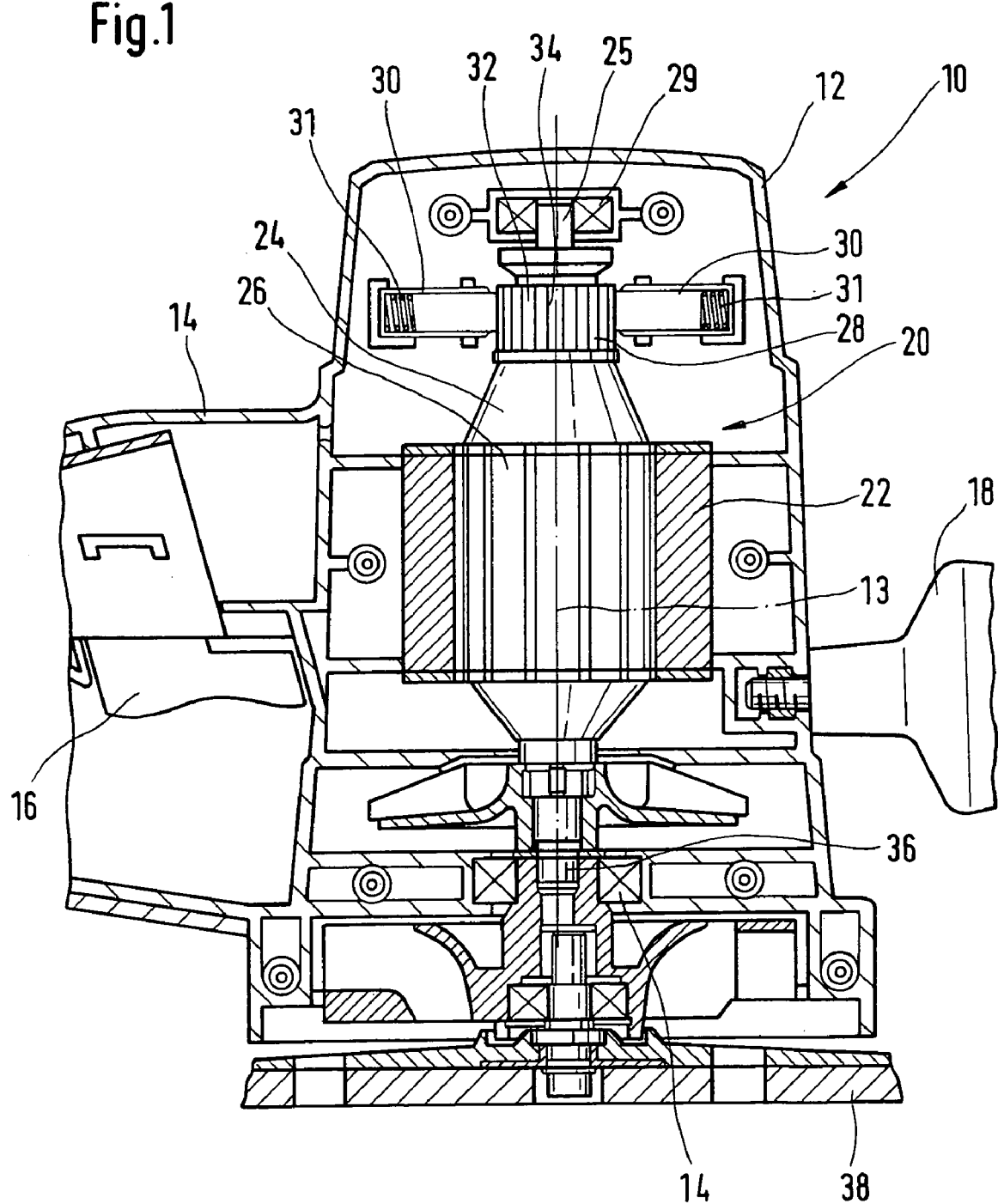
FIG. 1, a longitudinal section through a hand power tool with a universal motor.

FIG. 1 shows a longitudinal section through a hand power tool 10, designed as an eccentric wiper, whose stepped-cylindrical housing 12 has a vertically extending longitudinal axis 13 from which a main handle 14 extends essentially vertically radially outward, and an extra handle 18 extends in the opposite direction, that is, toward the front. On the underside of the main handle 14, there is a button 16 of a switch, not identified by reference numeral, that is provided for turning the hand power tool drive 10 on and off.

Centrally in the housing 20 or relative to the longitudinal axis 13, an electric motor 20 is provided, whose stator 22 is embraced without play by the housing 12 and fixed, and whose central rotor 24 comprises a central rotor shaft 25 that is equipped with radially outward-extending rotor blades. The rotor blades 26 are penetrated by an electrical wire winding, not identified by reference numeral, which is electrically connected to a commutator 28 in a known manner. The commutator 28 is seated on the upper end of the rotor 24 on the rotor shaft 25, whose end is in turn rotatably supported in a bearing 29 structurally connected to the housing. The commutator 28 is contacted electrically on diametrically opposite sides by two carbon brushes 30, which are braced, prestressed radially inward by means of springs 31, on the commutator 28.

The commutator 28 is composed of many laminations 32 joined together to form a ring. The laminations are spaced apart from one another by an electrical insulation 43 that forms a small interstice. Toward the bottom in the viewing direction, the rotor shaft 25 continues in the form of a drive shaft 36, where it drives a fan and a wiper plate 38 to rotate.

Figure 2:
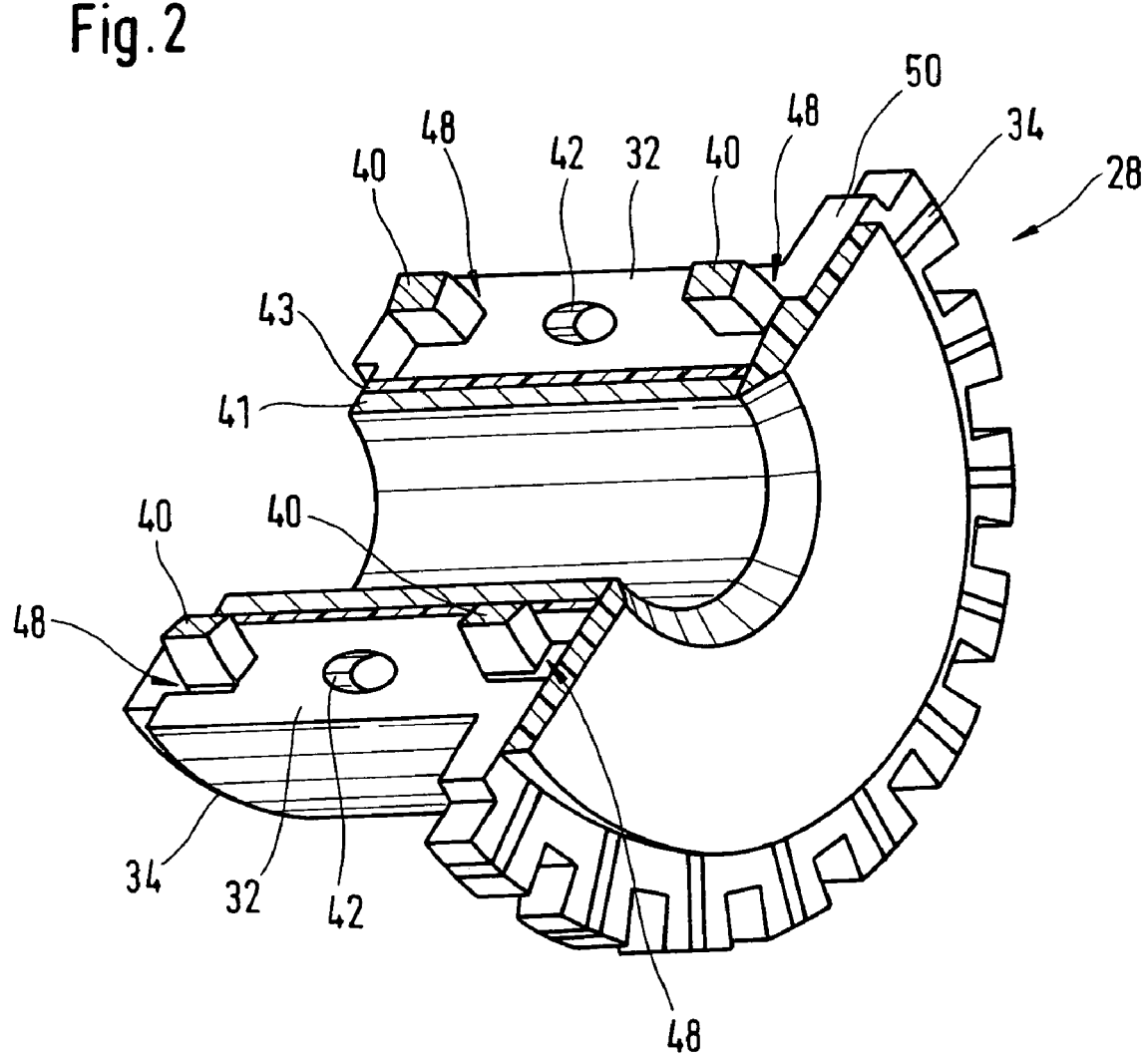
FIG. 2, the three-dimensional longitudinal section through a commutator.

FIG. 2 shows a variant of a commutator 28 of the invention in the form an enlarged detail. Its structure becomes clear as a result and is based on a central supporting cylinder 41, which is embraced by a tubular insulation layer 43, around which an annular packet of elongated, narrow laminations 32 of V-shaped cross section is composed. Each lamination 32 changes into a hook 50 bent outward at a right angle, which serves as a contact lug for connection to the electrical leads, not identified by reference numeral, of the rotor winding. Each of the low, elongated laminations 32, adjacent to the next lamination 32, has a radially flat electrical insulation layer 34. On both ends, each lamination 32 has groovelike peripheral recesses 48, through which a prestressable annular armature 40 reaches that keeps each individual lamination 32 prestressed radially inward against the support tube 41. As a result, at least the ends of the commutator laminations 32 are prevented from becoming detached radially outward from the support cylinder 41 or insulation layer 43 at operating speed in response to the high radial acceleration at approximately 30000 rpm.

Through a central recess 42 and a trapezoidal design of the outer ends 45 of the laminations, each individual lamination 32 is given a shape which reinforces its middle and end regions in such a way that they do not arch radially outward perceptibly even at extremely high rpm of the rotor. As a result, even at extremely high rpm, the lamination 32 remains level or straight on the outside, so that optimal electrical contact with the straight contact faces of the carbon brushes 30 is assured, and no convex longitudinal arching motions cause linear contact and hence increased spark development.

Figure 3:
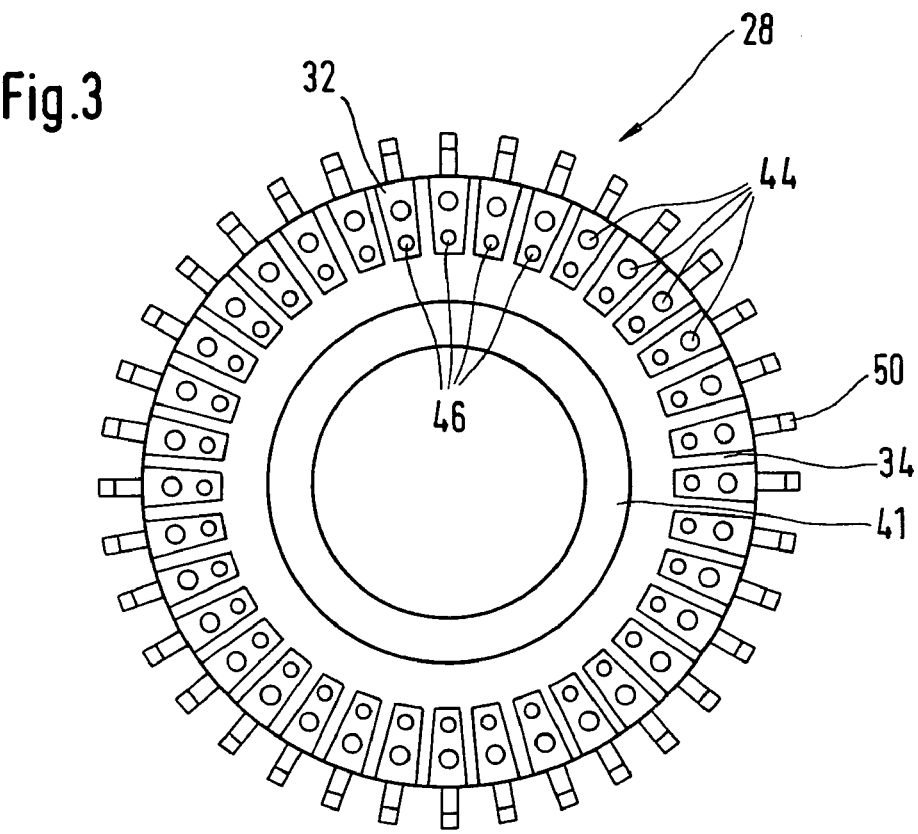
FIG. 3, a cross section through a collector of the invention.

FIG. 3 shows a cross section through the commutator 28; its laminations 32 of V-shaped cross section can be seen as they are made into a packet to form an annular structure, and the vertical insulation layer 34 and the hooks 50 on the side of the rotor can also be seen. The hooks 50 are provided with additional, fan-bladelike, punch-indented surfaces for cooling. All laminations 32 are provided with longitudinal recesses 44, 46, which extend through the entire lamination and lend it further-improved dimensional stability and reduce its mass.

Figure 4:
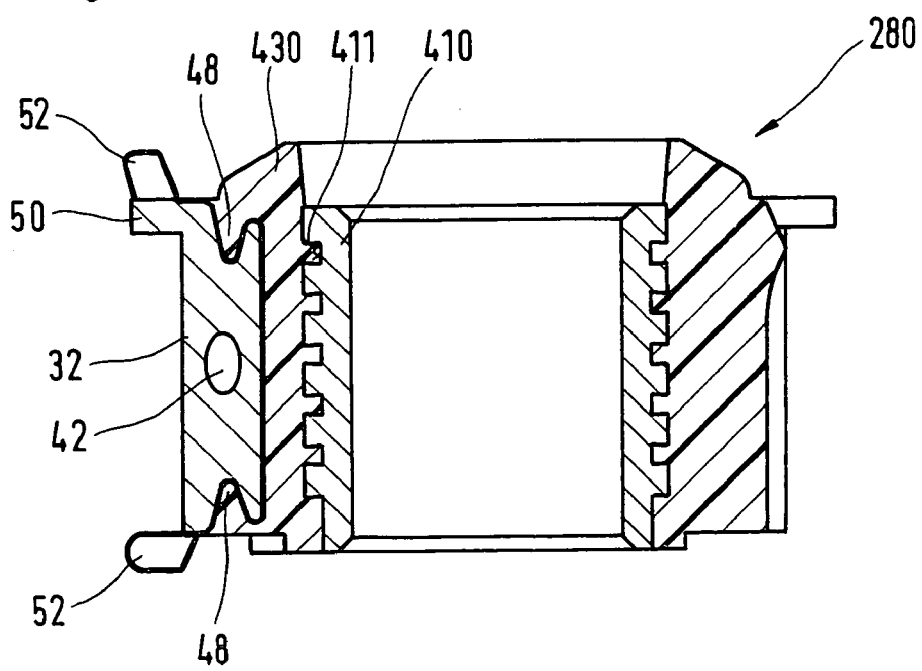
FIG. 4, a further longitudinal section through a collector of the invention.

FIG. 4 shows a longitudinal section through a further exemplary embodiment of a commutator 280, whose support tube 410 is provided with undercut grooves 411 which are engaged by a tubular insulation layer 430 so that it is firmly held, and this layer in turn supports an annular packet of laminations 32, with hooks 50 acting as contact lugs and with a central recess 42. These laminations 32 are potted with the insulation layer 43 and are firmly held by their entrance into the peripheral recesses 48.

On their outer ends, the laminations 32 have fan blades 52 for improving the motor cooling in the region of the commutator.

Figure 5:
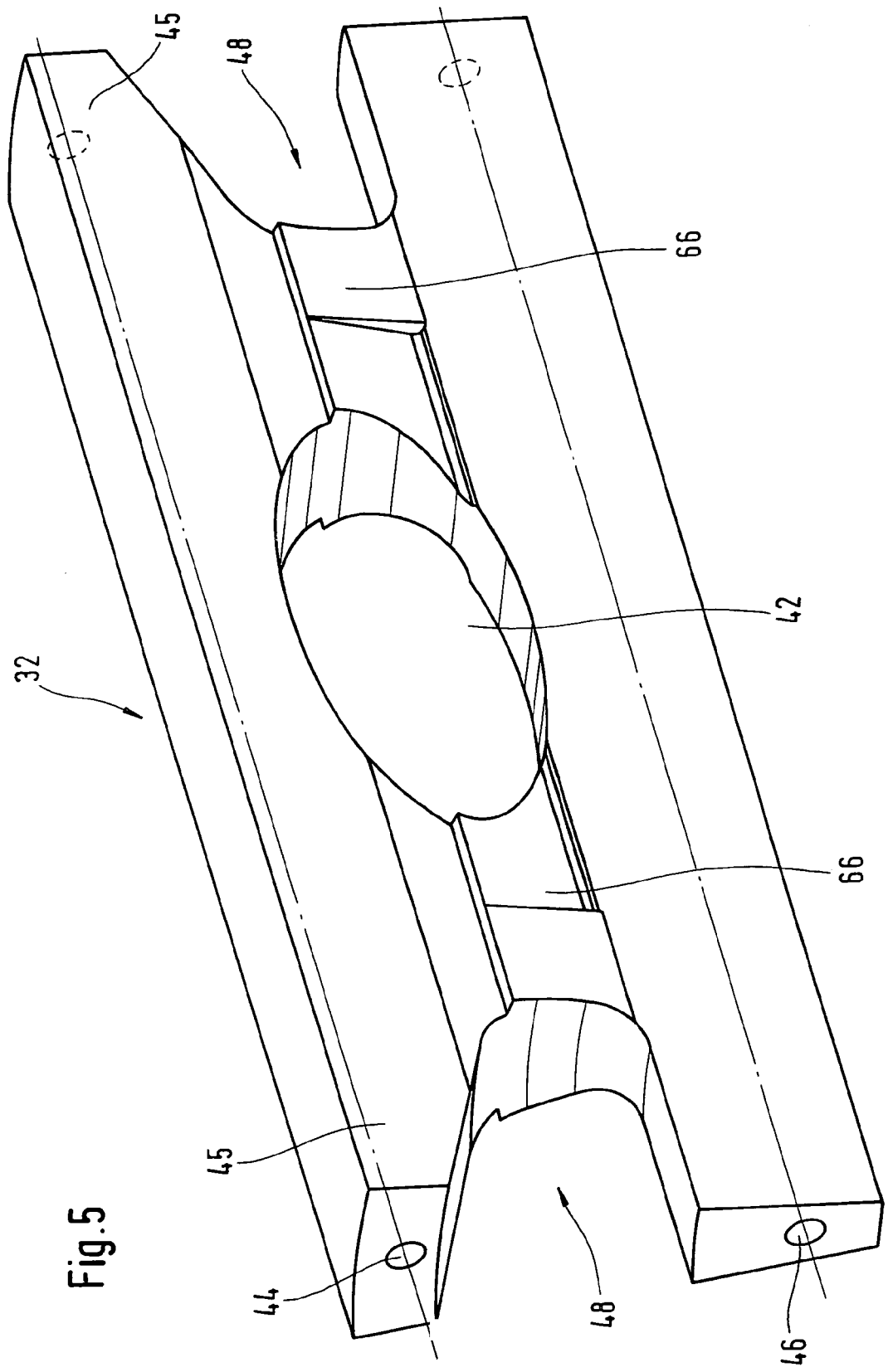
FIG. 5, a single lamination of the commutator.

FIG. 5 shows the detail of a lamination 32, its V-shaped cross section, and its peripheral recesses 48 and central recess 42, as well as longitudinal recesses 44, 46. Moreover, the side faces have impressed angular indentations, which further reinforce the structure of the lamination 32 and improve a form-locking connection with the respective insulation layer 34.

Figure 6:
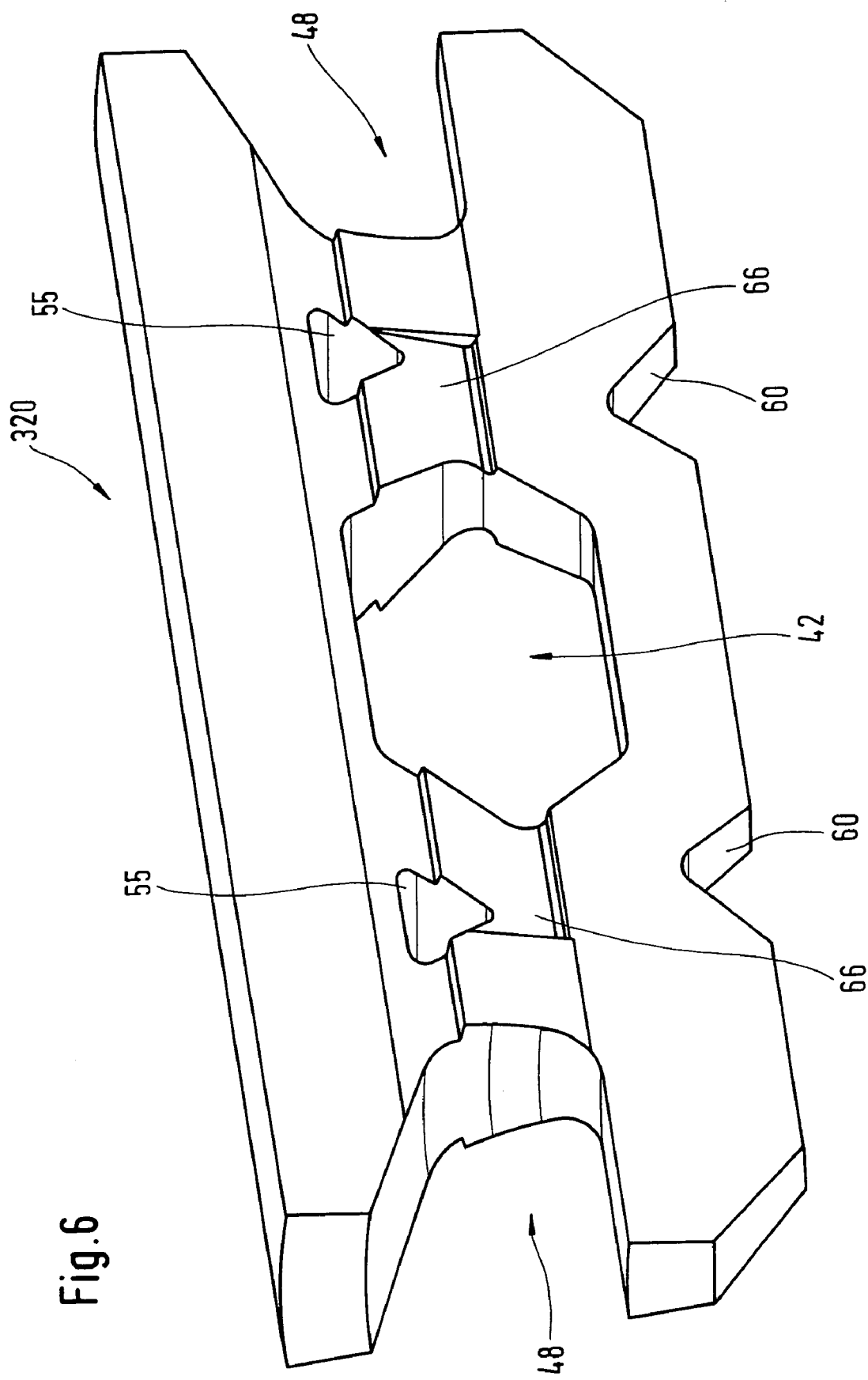
FIG. 6, a different variant of a single lamination.

FIGS. 5, 6 each show one exemplary embodiment of a lamination with trapezoidal outer ends in the region 45; the transversely extending central recess 42 forms an approximate hexagon, and located between it and the peripheral recesses 48 are further transversely extending, small triangular openings 55. Triangular notches 60 are also made in the lower long edge, diametrically opposite webs 66 of material.

Figure 7:
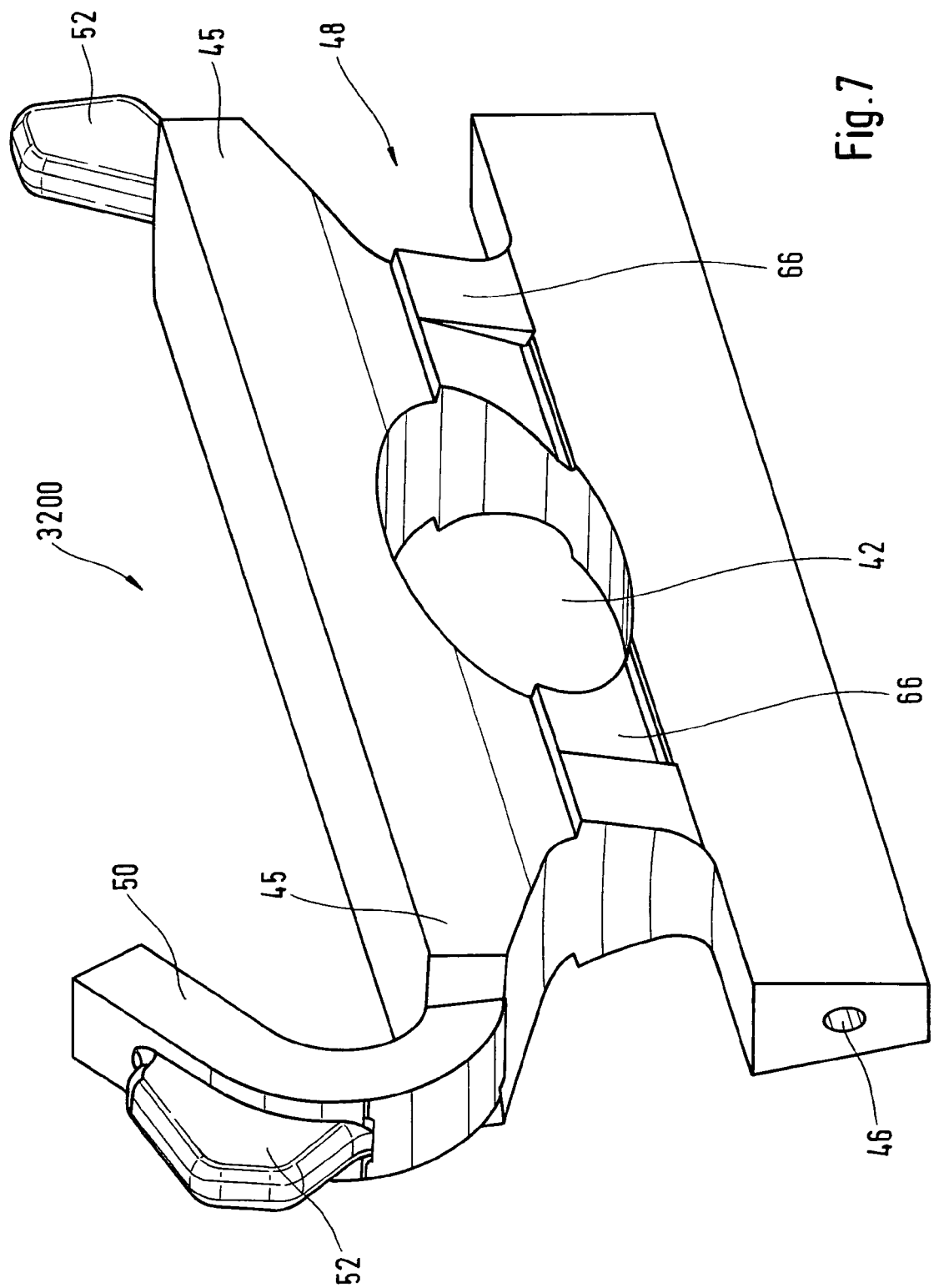
FIG. 7, a further variant of a single of the commutator.

FIG. 7 shows a lamination 3200, which substantially matches that of FIG. 5, with the distinction of having a hook 50, acting as a contact lug, with a fan blade 52 and on the other outer end a further fan blade 52 for improving the cooling in the commutator region.

The invention claimed is:

1. A hand power tool, comprising an electric motor having a commutator, said commutator being composed of a plurality of laminations having a central recess and forming a perforated section in said commutator, said recess being elongated in an axial direction and configured as a continuous opening, said laminations further having peripheral recesses which are arranged next to said central recess and provide a trapezoidal contour at ends of a periphery, so that said laminations have an anvil-shaped contour, said central elongated recess extending transversely through said laminations and forming an annular conduit, wherein said central recess is configured so that a flow of cooling air is passed through said central recesses in said laminations.

2. A hand power tool as defined in claim 1 wherein said central recess is configured as a punched recess with a closed, thin remaining wall.

3. A hand power tool as defined in claim 1, wherein said recess passes in aligned fashion through two diametrically opposed flat sides of said laminations.

4. A hand power tool as defined in claim 1 wherein said central recess is oval.

5. A hand power tool as defined in claim 1 wherein regions of each of said laminations above said central recess are configured so that at operating rpm and operating temperature they deform in such a way that a face to be electrically contacted with carbon brushes essentially forms a plane.

6. A hand power tool as defined in claim 1, wherein outer ends of said laminations are configured so that they act as a fan and put a flow of cooling air through said laminations into motion.

7. A hand power tool as defined in claim 1; and further comprising an annular armature which reaches through a recess selected from the group consisting of said central recess and said peripheral recess.

8. A hand power tool as defined in claim 7, wherein said annular armature is prestressed.

9. A hand power tool as defined in claim 1; and further comprising a tubular-stub-like everted feature each provided on one side of each of said laminations in a region of said central recess and protruding into said central recess on another side on each adjacent one of said laminations; and an insulating material provided between two adjacent ones of said laminations.

\* \* \* \* \*